United States Patent
Shikata et al.

(10) Patent No.: US 8,630,499 B2
(45) Date of Patent: Jan. 14, 2014

(54) IMAGE PROCESSING APPARATUS AND CONTROL METHOD THEREOF

(75) Inventors: Yasushi Shikata, Tama (JP); Teruki Kikkawa, Machida (JP); Yoshikazu Shibamiya, Tokyo (JP); Hirofumi Urabe, Kawasaki (JP); Daisuke Takayanagi, Kawasaki (JP); Chika Masuda, Sagamihara (JP)

(73) Assignee: Canon Kabushiki Kaisha, Tokyo (JP)

( * ) Notice: Subject to any disclaimer, the term of this patent is extended or adjusted under 35 U.S.C. 154(b) by 1209 days.

(21) Appl. No.: 12/274,156

(22) Filed: Nov. 19, 2008

(65) Prior Publication Data

US 2009/0129692 A1    May 21, 2009

(30) Foreign Application Priority Data

Nov. 21, 2007  (JP) ................. 2007-302079

(51) Int. Cl.
| | | |
|---|---|---|
| G06K 9/36 | (2006.01) |
| G06K 9/40 | (2006.01) |
| G06K 9/46 | (2006.01) |
| G06T 9/00 | (2006.01) |
| H04N 5/225 | (2006.01) |
| H04N 5/228 | (2006.01) |
| H04N 11/02 | (2006.01) |
| H04N 11/04 | (2006.01) |
| H04N 7/12 | (2006.01) |
| H04B 1/66 | (2006.01) |
| G06F 7/00 | (2006.01) |
| G06F 15/00 | (2006.01) |

(52) U.S. Cl.
USPC ........... 382/232; 382/254; 382/276; 345/555; 348/207.1; 348/222.1; 348/384.1; 375/240.29; 708/203

(58) Field of Classification Search
USPC ................. 345/555; 375/240.29; 708/203
See application file for complete search history.

(56) References Cited

U.S. PATENT DOCUMENTS 6,825,876 B1 * 11/2004 Easwar et al. ................. 348/234
7,221,469 B2    5/2007 Morita
(Continued)

FOREIGN PATENT DOCUMENTS

| JP | 07-023913 | 1/1995 |
| JP | 2003-018523 | 1/2003 |

(Continued)

OTHER PUBLICATIONS

The above reference was cited in a Oct. 7, 2011 Japanese Office Action, which is enclosed without an English Translation, that issued in Japanese Patent Application No. 2007-302079.

Primary Examiner — Randolph I Chu
Assistant Examiner — Nathan Bloom
(74) Attorney, Agent, or Firm — Cowan, Liebowitz & Latman, P.C.

(57) ABSTRACT

When an image processing apparatus capable of connecting to a digital camera is to perform image-correction processing on irreversible-compression encoded image data acquired from the digital camera, it is determined whether the image-correction processing can be executed by the connected digital camera. When the processing can be executed, it is confirmed whether or not RAW data that corresponds to the irreversible-compression encoded image data is present in the digital camera. If the corresponding RAW data is present in the digital camera, the digital camera is requested to execute the image-correction processing based on the RAW data. This makes it possible to suppress degradation in the image quality more than when directly correcting an irreversible-compression encoded image.

17 Claims, 11 Drawing Sheets

(56) References Cited

U.S. PATENT DOCUMENTS

| | | | |
|---|---|---|---|
| 7,239,754 B2 * | 7/2007 | Akimoto et al. | 382/240 |
| 7,272,641 B2 | 9/2007 | Yamagishi | |
| 7,724,281 B2 * | 5/2010 | Vale et al. | 348/207.1 |
| 2001/0020979 A1 * | 9/2001 | Lathrop | 348/222 |
| 2002/0031147 A1 * | 3/2002 | Anderson et al. | 370/487 |
| 2004/0012686 A1 * | 1/2004 | Ono et al. | 348/211.99 |
| 2005/0146621 A1 * | 7/2005 | Tanaka et al. | 348/211.2 |
| 2006/0103737 A1 * | 5/2006 | Okisu et al. | 348/222.1 |

FOREIGN PATENT DOCUMENTS

| | | |
|---|---|---|
| JP | 2003-060839 | 2/2003 |
| JP | 2003-187258 | 7/2003 |
| JP | 2006-148434 A | 6/2006 |
| JP | 2007-006125 | 1/2007 |

\* cited by examiner

IMAGE PROCESSING APPARATUS AND CONTROL METHOD THEREOF

BACKGROUND OF THE INVENTION

1. Field of the Invention

The present invention relates to an image processing apparatus and a control method thereof, and particularly relates to an image processing apparatus that processes an image captured by a digital camera, and a control method for such an image processing apparatus.

2. Description of the Related Art

Viewing images captured using a digital camera on a television receiver (called simply a "TV" hereinafter) has become common in recent years.

Conventional TVs do not have a digital interface, and thus image data has been inputted into the TV from the digital camera and displayed using an analog video input terminal. However, TVs that feature digital interfaces such as HDMI (High-Definition Multimedia Interface) and USB (Universal Serial Bus) are becoming common due to the start of digital broadcasting. In addition to image data, digital interfaces such as these are capable of exchanging control information between the connected devices. Therefore, it is possible for TVs and digital cameras to exchange and display image data in cooperation with each other.

One of the differences between connecting a digital camera to a TV via HDMI and connecting a digital camera to a TV via USB is the location where the image data is decoded. When using an HDMI connection, the image data is decoded in the digital camera and forward transmitted to the TV, whereupon the TV displays the data. On the other hand, when using a USB connection, the digital camera transmits the image data to the TV without decoding it, whereupon the TV decodes the data and displays it.

Considering that TVs are generally operated using a remote control, the USB connection, where the TV decodes the image data, is considered to have a higher level of freedom with regards to manipulation, management, and so on of the image data.

Meanwhile, as browsing images taken with a digital camera on a TV becomes even more commonplace, it is likely that demand will arise for the ability to edit and process images that are being browsed on the TV. For example, it is likely that users will wish to perform red-eye correction, white balance adjustment, and etc. on images displayed on their TVs.

Generally speaking, the JPEG format is an image data format that TVs are capable of decoding; however, as is well-known, the JPEG format is an irreversible-compression encoding format, meaning that the image quality is degraded each time an image is edited or processed after decoding and encoded during storage. However, there are schemes for digital cameras that make it possible to record images without performing irreversible-compression encoding, a representative example of which is recording in the RAW format.

As opposed to the JPEG format, the RAW format does not involve irreversible-compression encoding, and thus the image quality is not degraded even when image data is repeatedly stored. However, TVs normally cannot handle data in the RAW format (called "RAW data" hereinafter). For this reason, it is necessary for the digital camera to convert images from the RAW format to the JPEG format, or record images in the JPEG format in parallel with their RAW format counterparts, and supply those JPEG images to the TV. Therefore, even if RAW data has been present in the digital camera, TVs have nevertheless had to handle the images in the JPEG format (called "JPEG images" hereinafter).

Using, for example, a digital camera connected via a digital interface as a device that performs high-speed processing of RAW format images has been proposed in Japanese Patent Laid-Open No. 2007-6125 (referred to as "Patent Document 1" hereinafter). According to Patent Document 1, a computer in which RAW data is stored outputs the RAW data to a connected digital camera. The digital camera then converts the RAW data into a JPEG image and returns the image to the computer, thereby implementing the process at a higher speed than is possible when using the computer's processor.

However, the method disclosed in Patent Document 1 discusses a computer, which is capable of holding and processing (albeit slowly) RAW data, using a digital camera as a so-called hardware accelerator, and thus the prerequisites differ from TVs, which cannot process RAW data from the outset. Furthermore, Patent Document 1 makes no particular mention of the editing and processing of JPEG images present in the computer.

As illustrated here, the presence or absence of RAW data for a particular image in a digital camera when correcting that image has not been given consideration in conventional image processing apparatuses capable of receiving and correcting images that have undergone irreversible-compression encoding from a digital camera.

SUMMARY OF THE INVENTION

The present invention has been conceived in light of these problems with conventional technologies. The present invention suppresses degradation in post-correction image quality in an image processing apparatus capable of correcting images, acquired from a digital camera, that have undergone irreversible-compression encoding and in a control method for such an image processing apparatus.

According to an aspect of the present invention, there is provided an image processing apparatus having an interface capable of exchanging data and control information with a digital camera, comprising: an acquisition unit that acquires irreversibly-compressed image data from a digital camera connected via the interface; an image correction unit that performs image-correction processing specified by the user on the image data; a determination unit that determines whether to request the digital camera or the image correction unit to perform the image-correction processing on the image data; and a control unit that requests the image correction unit or the digital camera to perform the image-correction processing on the image data in accordance with the result of the determination performed by the determination unit, wherein the determination unit determines to request the digital camera to perform the image-correction processing in the case where the image-correction processing is executable by the digital camera and RAW data corresponding to the image data is present in the digital camera, and determines to request the image correction unit to perform the image-correction processing in the case where the image-correction processing is not executable by the digital camera or RAW data corresponding to the image data is not present in the digital camera.

According to another aspect of the present invention, there is provided an control method for an image processing apparatus provided with an image correction unit for performing image-correction processing specified by a user on image data and an interface capable of exchanging data and control information with a digital camera, comprising the steps of: acquiring irreversibly-compressed image data from a digital camera connected via the interface; determining whether to request the digital camera or the image correction unit to perform the image-correction processing on the image data;

and requesting the image correction unit or the digital camera to perform the image-correction processing on the image data in accordance with the result of the determination performed in the step of determining, wherein the step of determining determines to request the digital camera to perform the image-correction processing in the case where the image-correction processing is executable by the digital camera and RAW data corresponding to the image data is present in the digital camera, and determines to request the image correction unit to perform the image-correction processing in the case where the image-correction processing is not executable by the digital camera or RAW data corresponding to the image data is not present in the digital camera.

Further features of the present invention will become apparent from the following description of exemplary embodiments with reference to the attached drawings.

DESCRIPTION OF THE EMBODIMENTS

Preferred embodiments of the present invention shall now be described in detail in accordance with the accompanying drawings.

First Embodiment

Figure 1:
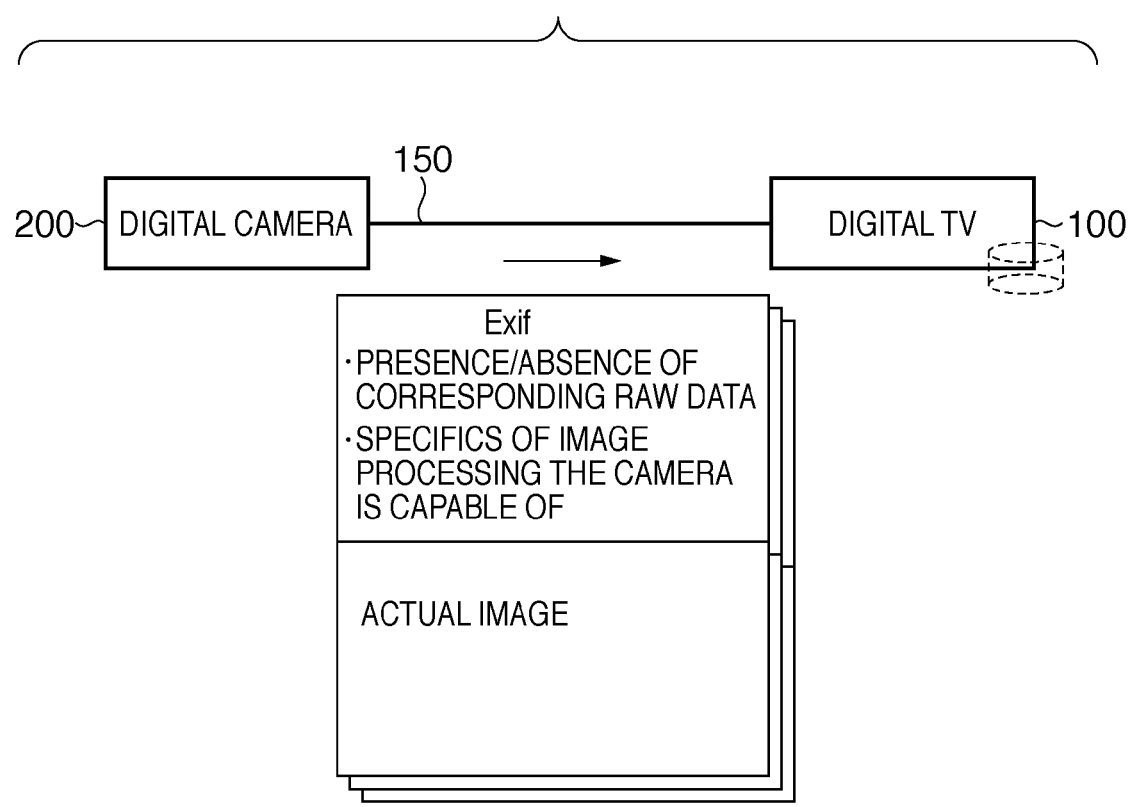
FIG. 1 is a diagram schematically illustrating an example of an image processing system in which a digital television receiver serving as an example of an image processing apparatus according to a first embodiment of the present invention is connected to a digital camera.

FIG. 1 is a diagram schematically illustrating an example of an image processing system in which a digital television receiver (called simply a "digital TV" hereinafter) serving as an example of an image processing apparatus according to a first embodiment of the present invention is connected to a digital camera.

Note that the present invention can be applied in an arbitrary device that is capable of exchanging image files and control information with a digital camera and of decoding compression-encoded images, but that cannot perform image processing (that is, development processing) for converting RAW data into a displayable format.

FIG. 1 is a diagram illustrating an outline of the configuration of the system according to the first embodiment of the present invention. A digital TV 100 is connected to a digital camera 200 by a digital interface cable 150 capable of carrying data and control information. USB, IEEE 1394, and HDMI are examples of such a digital interface. Note that the connection may instead be wireless, rather than using the cable 150.

The digital TV 100 acquires an image file including a compression-encoded image from the digital camera 200. In the present embodiment, the image file acquired by the digital TV 100 includes an image that has been compression-encoded according to the JPEG standard. In addition to the data of the image itself, the image file also includes the following information as attribute information:

information indicating whether or not corresponding RAW data is present in the digital camera 200 (presence/absence information)

information indicating the image-correction processing that can be executed by the digital camera 200

This information can be added to each image file as, for example, part of the file header when the digital camera 200 records the images. When the digital camera 200 generates an image file according to, for example, the Exif (Exchangeable image file format for Digital Still Camera) standard, the information is recorded in a user area (for example, MakerNote) included in a non-compressed area of the image file.

It is assumed, in the following descriptions, that the digital camera 200 generates image files in the Exif format, and that the digital TV 100 decodes the JPEG images included in those image files and refers to the values in the user area of the image files.

Figure 2:
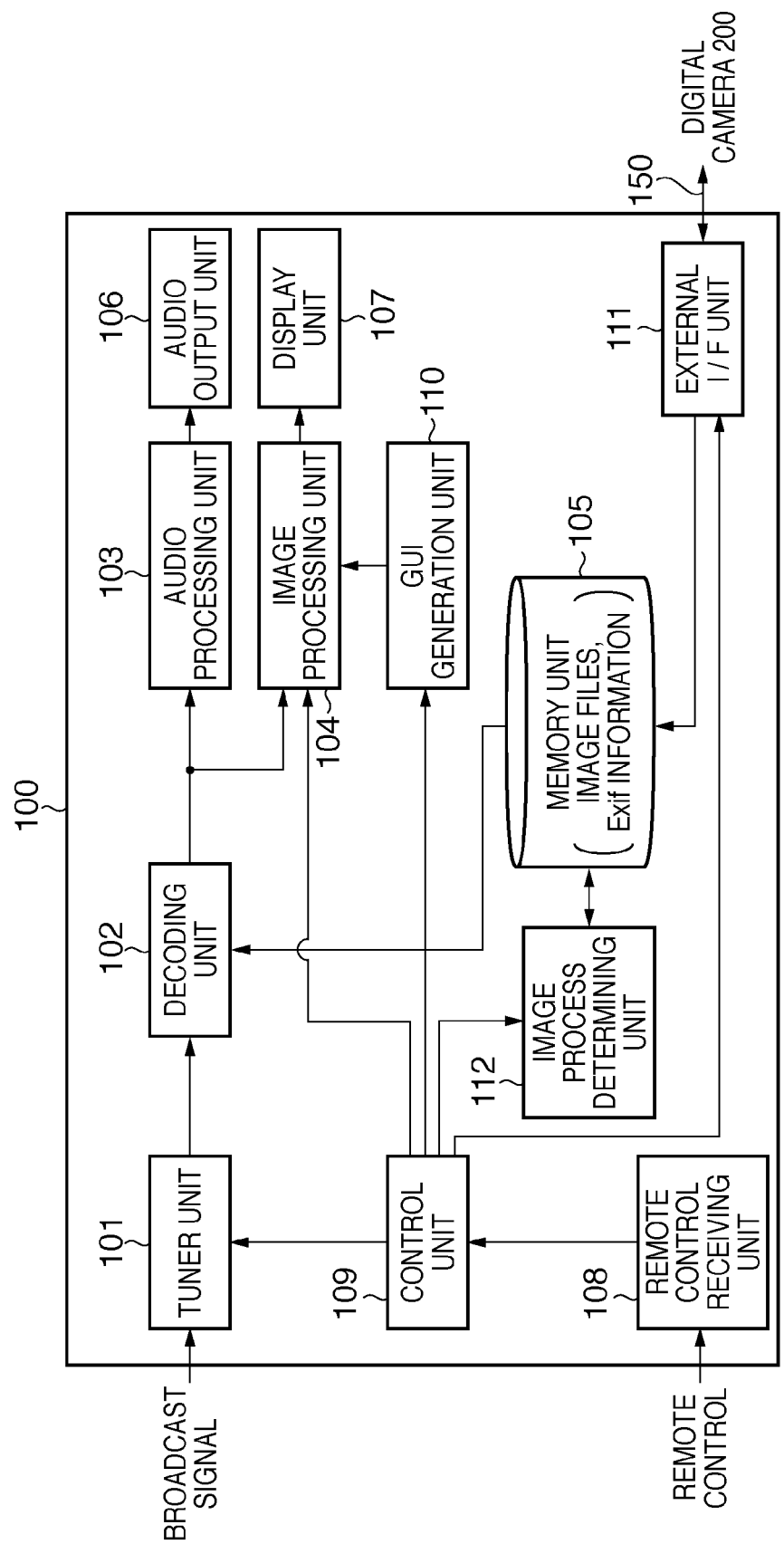
FIG. 2 is a block diagram illustrating an example of the overall functional configuration of a digital TV 100 according to an embodiment of the present invention.

FIG. 2 is a block diagram illustrating an example of the overall functional configuration of the digital TV 100.

The digital TV 100 includes a tuner unit 101, a decoding unit 102, an audio processing unit 103, an image processing unit 104, a memory unit 105, an audio output unit 106, a display unit 107, a remote control receiving unit 108, and a control unit 109. The digital TV 100 further includes a GUI generation unit 110, an external I/F unit 111, and an image process determining unit 112.

The tuner unit 101 includes reception tuners compliant with broadcasting formats such as BS, CS, terrestrial digital broadcasting, and so on. In response to a channel selection request from the control unit 109, the tuner unit 101 selects an appropriate reception tuner and executes a demodulation process on a digital broadcasting signal received through an antenna (not shown). Thereafter, the tuner unit 101 re-generates data with multiplexed video, audio, and so on (transport stream (TS) data), and outputs this TS data to the decoding unit 102.

The decoding unit 102 demultiplexes the TS data provided by the tuner unit 101 into video data, audio data, and so on, and decodes that data. The decoding unit 102 outputs the results of the decoding, outputting the video data to the image processing unit 104 and the audio data to the audio processing unit 103. Furthermore, the decoding unit 102 decodes image files stored in the memory unit 105 and outputs the results thereof to the image processing unit 104. The results of decoding an image file shall be called "image data" hereinafter.

The audio processing unit 103 performs audio processing such as tone control, D/A conversion, and amplification on the audio data outputted from the decoding unit 102, and then outputs the processed data to the audio output unit 106. The audio output unit 106 is, for example, an audio output terminal, a speaker, or the like.

The image processing unit 104 combines image data, video data, and so on outputted from the decoding unit 102 with GUI (Graphical User Interface) data created by the GUI generation unit 110. The image processing unit 104 also performs image processing such as noise reduction, decompression processing, contrast correction, edge enhancement, white balance correction, and the like on the data before and after the combination. The results of this combination performed by the image processing unit 104 (that is, image data for display) are displayed by the display unit 107. The display unit 107 may be an external monitor.

The memory unit 105 is a non-volatile or volatile memory, and is used primarily for storing image files.

The remote control receiving unit 108 receives a remote control code from a remote control (not shown) through, for example, infrared communication, and transmits the received remote control code to the control unit 109.

The control unit 109 then performs control based on the remote control code received from the remote control receiving unit 108. In addition to normal television control such as channel selection, input switching, and so on, the control performed by the control unit 109 also includes instructing the GUI generation unit 110 to render a GUI and instructing the image processing unit 104 to correct image data, video data, and the like that is being displayed. Furthermore, the control unit 109 instructs the external I/F unit 111 to receive image files from and exchange control information with the digital camera 200 that is connected thereto. The control unit 109 is, for example, a microprocessor, and executes a pre-stored control program, thereby controlling the overall operations of the digital TV 100.

The GUI generation unit 110 creates GUI (Graphical User Interface) data based on a request from the control unit 109. In the present embodiment, the GUI generation unit 110 creates GUI operational panel data for performing correction processing on image data displayed in the display unit 107. The created GUI data is displayed in combination with the image data from the image processing unit 104.

The external I/F unit 111 is a digital interface capable of exchanging image files and control information with the digital camera 200. In the present embodiment, image files held in the digital camera 200 are acquired via the external I/F unit 111 and are then stored in the memory unit 105. The exchange of control information with the digital camera 200 is also carried out via the external I/F unit 111.

The image process determining unit 112 determines whether to perform the correction process instructed by a user through the GUI operational panel in the digital TV 100 (the image processing unit 104) or in the digital camera 200, in response to a request from the control unit 109. In the present embodiment, the image process determining unit 112 acquires the attribute information (Exif information) regarding the image data being displayed from the memory unit 105, and performs the determination based upon that attribute information.

It should be noted that in the present embodiment, the control unit 109 issues the determination request to the image process determining unit 112 in accordance with an instruction from the user received via the remote control. For example, when an instruction to execute a certain correction process on image data being displayed (white balance correction, for example) has been received, the control unit 109 issues the determination request to the image process determining unit 112.

The results of the determination made by image process determining unit 112 are communicated to the control unit 109. In the case where the determination results indicate "perform using the digital TV 100", the control unit 109 requests the image processing unit 104 to execute the correction process that the user instructed the image processing unit 104 to perform. However, in the case where the determination results indicate "perform using the digital camera 200", the control unit 109 requests the digital camera 200 to perform the correction process via the external I/F unit 111.

Figure 3:
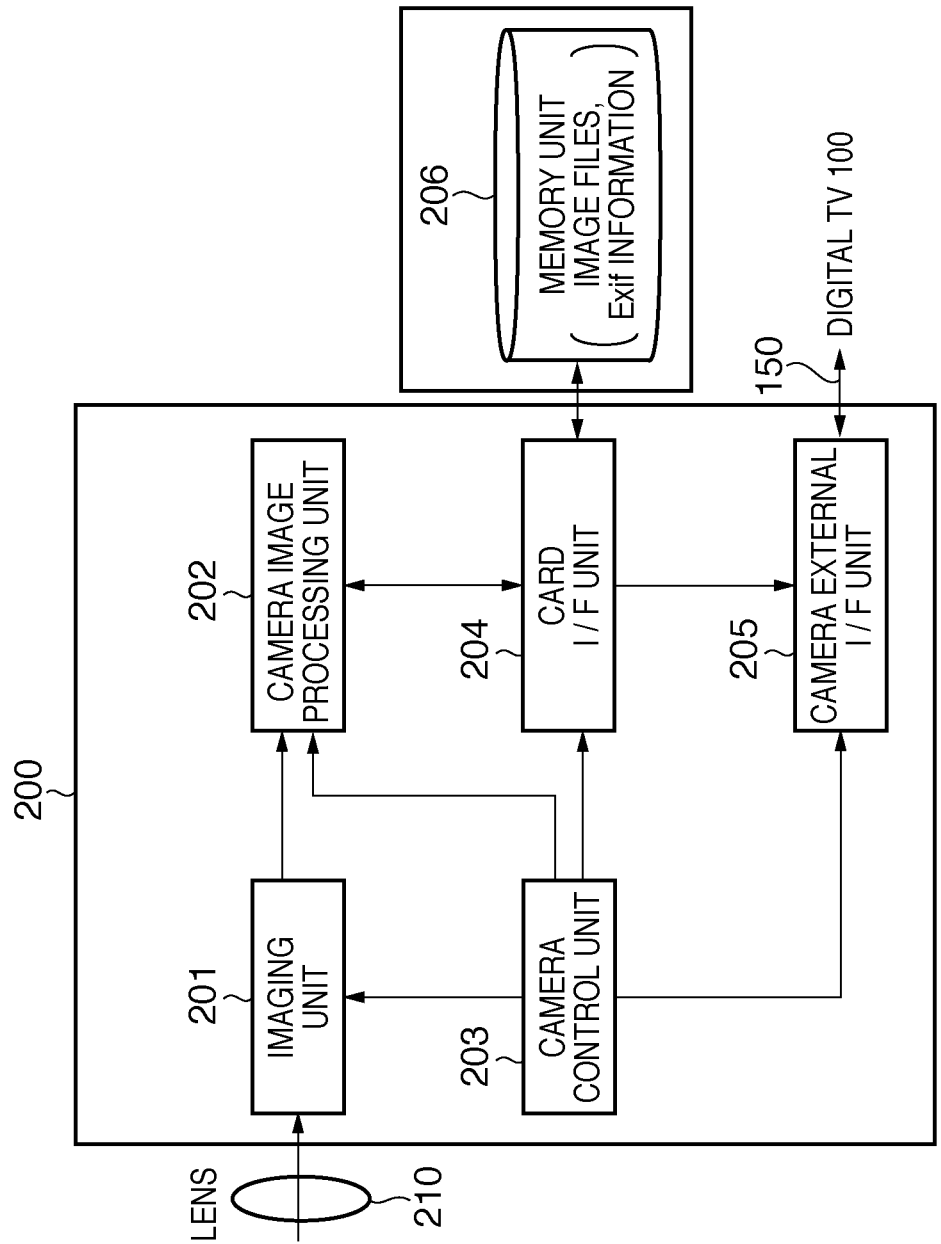
FIG. 3 is a block diagram illustrating an example of the overall functional configuration of a digital camera 200 according to an embodiment of the present invention.

FIG. 3 is a block diagram illustrating an example of the overall functional configuration of the digital camera 200.

The digital camera 200 includes an imaging unit 201, a camera image processing unit 202, a camera control unit 203, a card I/F unit 204, a camera external I/F unit 205, a memory card 206, and a lens 210.

The imaging unit 201 includes an image sensor, an A/D converter, and so on, and converts a subject image formed on the image sensor by the lens 210 into electrical signals on a pixel-by-pixel basis through the image sensor. The electrical signals read out from the image sensor are then converted into digital data using the A/D converter, thereby generating RAW data.

The camera image processing unit 202 performs predetermined image processing on the generated RAW data, thereby converting that data into a JPEG image file. Note that the following attribute information is added to the JPEG image file at this time:

information indicating whether or not corresponding RAW data is present in the digital camera 200 (presence/absence information)

information indicating the image-correction processing that can be executed by the digital camera 200

In the present embodiment, the following are examples of "image-correction processing executable by the digital camera 200":

brightness adjustment;
color strength adjustment;
reduction of various types of noise;
red-eye correction; and
white balance correction.

Information regarding which of these correction items can be carried out is added to the image file as the attribute information.

Furthermore, information regarding correction parameters that can be set is also added per correction item that can be carried out. For example, in the case of noise reduction, parameters for setting the strength of the correction processing, such as "strong", "medium", "weak", and so on, are added. Furthermore, in the case of white balance correction, several color temperatures to be used as references are added as settable correction parameters.

The camera control unit 203 controls the imaging unit 201, the camera image processing unit 202, and the card I/F unit 204 in response to, for example, imaging instructions from the user, thereby generating an image file. The generated image file is recorded into the memory card 206.

The format of the image file generated by the digital camera 200 in the present embodiment is one of three types: a RAW data file only; a JPEG image file only; or both a RAW data file and a JPEG image file. One of these three types is set in advance by, for example, the user, and the digital camera 200 generates image files in accordance therewith.

Meanwhile, when connected to the digital TV 100 via the camera external I/F unit 205, the camera control unit 203 transmits the JPEG image files within the memory card 206 to the digital TV 100 in accordance with a request from the digital TV 100.

The card I/F unit 204 is an interface between the digital camera 200 and the removable memory card 206. The memory card 206 includes a non-volatile semiconductor memory. Note that multiple memory cards 206 may be mountable in the digital camera 200; the memory card 206 may also be installed internally in the digital camera 200.

The camera external I/F unit 205 is an interface for external devices, namely, the digital TV 100, and is a digital interface capable of exchanging data and control information. In the present embodiment, image files within the digital camera 200 are transmitted to an external device via the camera external I/F unit 205. Furthermore, the exchange of control information between the camera control unit 203 and the digital TV 100 is also carried out via the camera external I/F unit 205.

Figure 4:
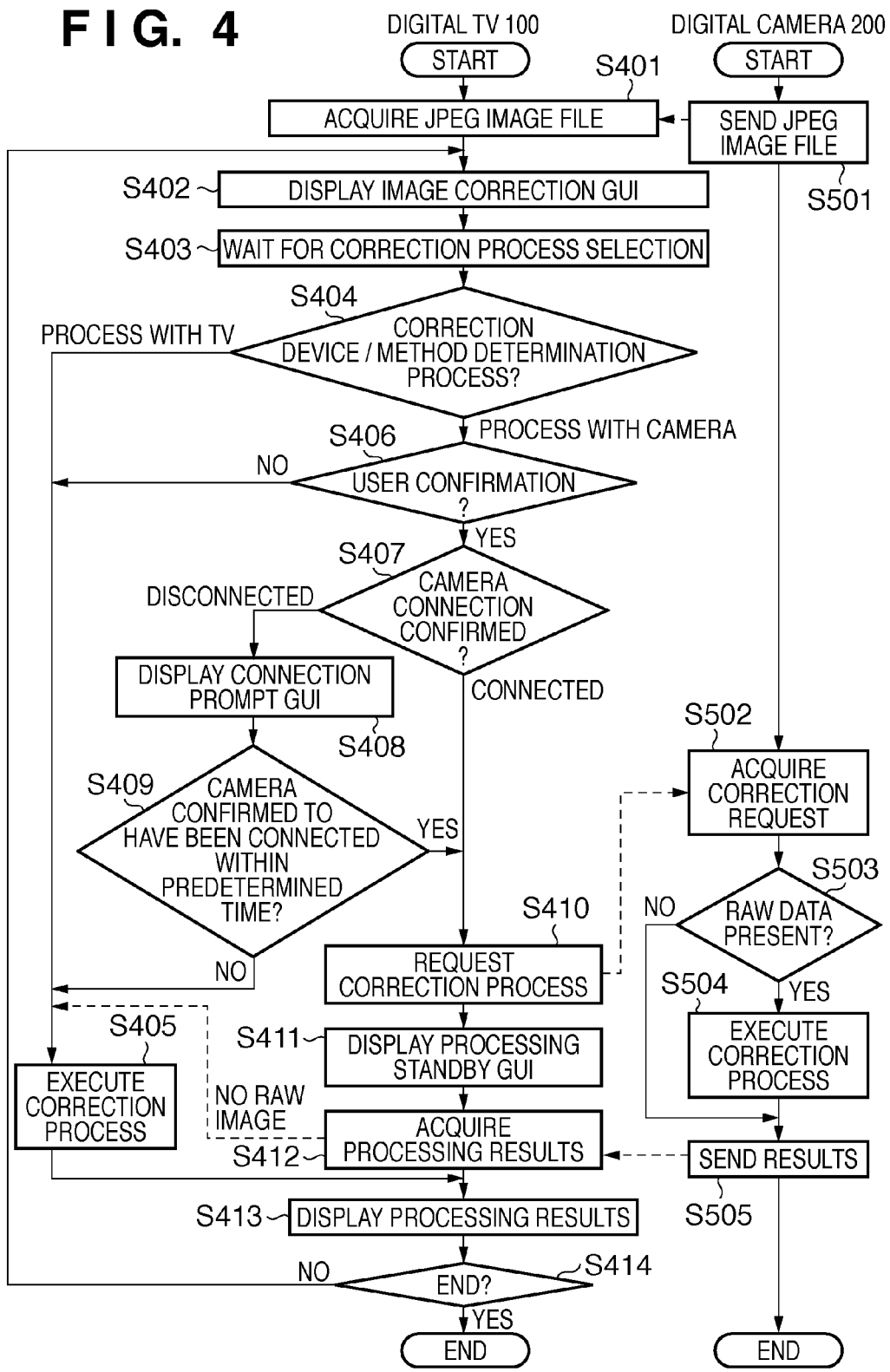
FIG. 4 is a flowchart illustrating an outline of image-correction processing performed by the image processing system according to the first embodiment of the present invention.

FIG. 4 is a flowchart illustrating an outline of image-correction processing performed in the present invention.

First, the processing performed by the digital TV 100 shall be described.

First, the control unit 109 of the digital TV 100 acquires an image file from the digital camera 200 through the external I/F unit 111 (S401). The timing of this acquisition is when the digital camera 200 is connected, when instructed by a user, or the like. The control unit 109 stores the acquired image file in the memory unit 105 via the external I/F unit 111.

In response, for example, to an instruction from the user requiring the display of an image-correction processing GUI, the control unit 109 executes a series of processes for displaying an operational panel for image display (S402). First, the control unit 109 issues a request to create the image-correction GUI to the GUI generation unit 110. At the same time, the control unit 109 issues a request to decode the image file stored in the memory unit 105 to the decoding unit 102. Then, the control unit 109 issues, to the image processing unit 104, a request to combine the GUI created by the GUI generation unit 110 with the image data outputted by the decoding unit 102.

Figure 5:
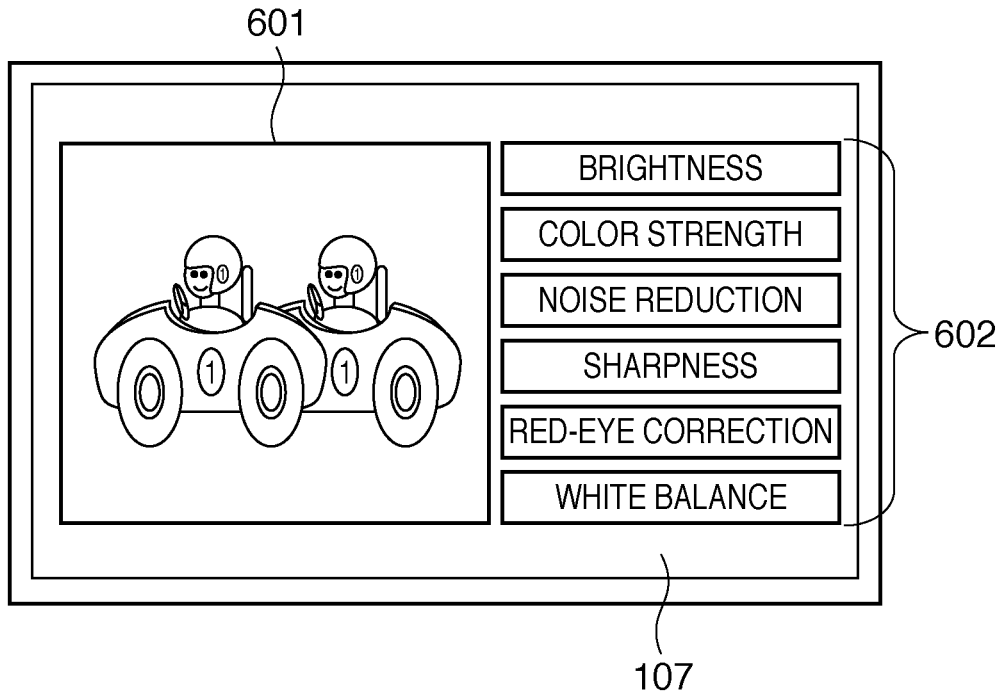
FIG. 5 is a diagram illustrating an example of a state in which an image-correction GUI and an image are displayed together in a display unit 107 of the digital TV 100 according to the first embodiment of the present invention.

FIG. 5 is a diagram illustrating an example of a state in which an image-correction GUI and an image are displayed together in the display unit 107 of the digital TV 100.

A JPEG image 601 is displayed in the left side of the screen of the display unit 107, and an image-correction GUI 602 is displayed in the right side of the screen. The following correction processing items that can be selected by the user are included in the image-correction GUI 602 shown in FIG. 5: brightness adjustment; color strength adjustment; reduction of various types of noise; red-eye correction; sharpness; and white balance correction. The user uses a predetermined GUI operating unit, such as an arrow key or the like on the remote control (not shown), highlights the desired correction processing item, and enters the highlighted correction processing item through an operation such as depressing an enter key 308 on the remote control (S403). Although not shown in the drawings, note that upon a correction processing item being entered, the GUI generation unit 110 displays a GUI that provides correction parameters that can be set for the entered correction processing item. The user can then instruct the specifics of the final correction to the digital TV 100.

Upon a correction process (for example, white balance correction) being selected in S403, the control unit 109 issues, to the image process determining unit 112, a request to determine the device that will perform the correction. Upon receiving this request, the image process determining unit 112 acquires the attribute information of the image data being displayed from the memory unit 105, and determines whether the correction process specified by the user is to be performed by the digital camera 200 or the digital TV 100 (S404). Details of this determination process shall be provided later.

In the case where the results of the determination performed by the image process determining unit 112 in S404 indicate that the processing is to be performed by the digital TV 100, the control unit 109 issues, to the image processing unit 104, a request to execute the correction process specified by the user through the image-correction GUI 602 (S405).

Figure 6:
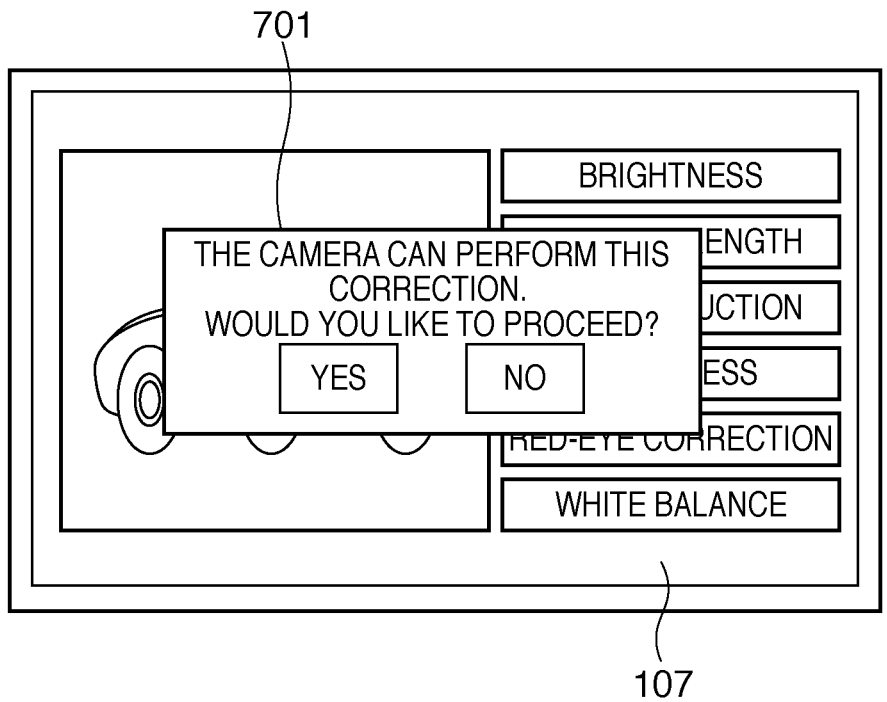
FIG. 6 is a diagram illustrating an example of a GUI, displayed in the display unit 107 of the digital TV 100, that requests the digital camera 200 to be connected, according to the first embodiment of the present invention.

Meanwhile, in the case where the image process determining unit 112 has determined in S404 that the correction process is to be performed by the digital camera 200, the control unit 109 causes the GUI generation unit 110 to create a GUI for the user to confirm whether or not to carry out the correction process using the digital camera 200. The control unit 109 then issues, to the image processing unit 104, a request to overlap this confirmation GUI 701 onto the currently-displayed image (S406). FIG. 6 illustrates an example of the display of this confirmation GUI 701.

If the user selects "no", the procedure moves to S405, where the control unit 109 issues, to the image processing unit 104, a request to execute the correction process. However, if the user selects "yes" in S406, the control unit 109 confirms whether or not the digital camera 200 is connected, via the external I/F unit 111 (S407).

In S407, in the case where the digital camera 200 is connected, the control unit 109 issues, to the digital camera 200, a request to execute the correction process (S410). At this time, the control unit 109 sends identification information of the image file to be corrected, the specifics of the correction process, and the correction parameters to the camera. The file name of the image file to be corrected can be given as an example of the identification information. The correction parameters selected by the user (or values close thereto) are sent. The digital camera 200 identifies the corresponding RAW data file based on the identification information acquired from the digital TV 100. Furthermore, the correction process specified by the digital TV 100 is applied to the corresponding RAW data using the camera image processing unit 202, thereby converting the data into a JPEG image file, which is then returned to the digital TV 100. This processing performed by the digital camera 200 shall be described in detail later.

Figure 7:
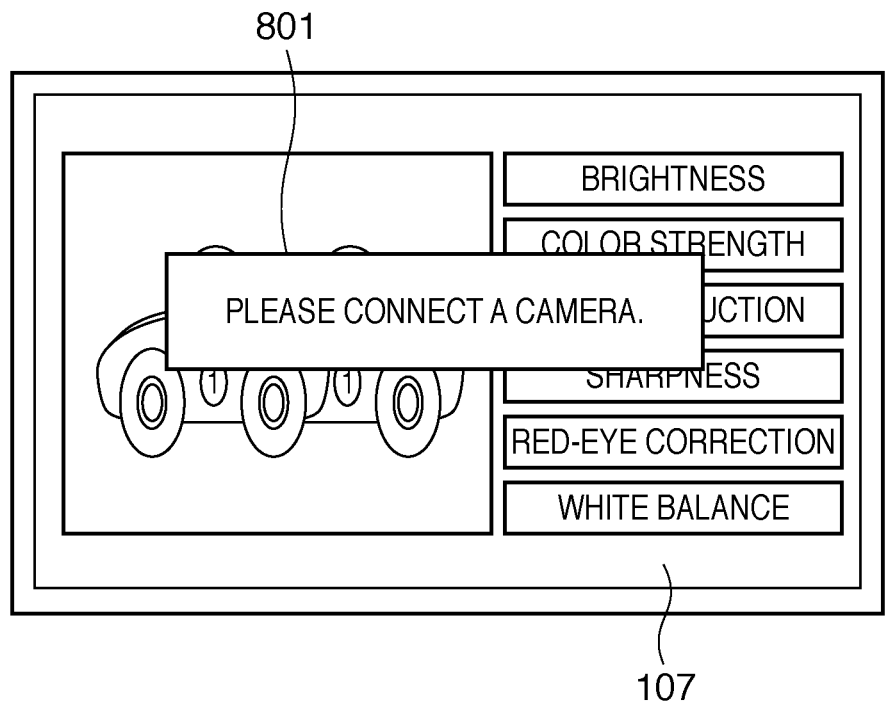
FIG. 7 is a diagram illustrating an example of a confirmation GUI displayed in the display unit 107 of the digital TV 100 according to the first embodiment of the present invention.

In S407, in the case where the digital camera 200 is not connected, the control unit 109 causes the GUI generation unit 110 to create a message GUI prompting the user to connect the digital camera 200; the created GUI is displayed in the display unit 107 via the image processing unit 104 (S408). FIG. 7 illustrates an example of the display of a message GUI 801 prompting the connection of the digital camera.

The control unit 109 monitors the connection status of the digital camera 200 via the external I/F unit 111, and in the case where no connection is established within a predetermined amount of time, ends the display of the message GUI 801 and issues, to the image processing unit 104, a request to execute the correction process (S405). Meanwhile, when the control unit 109 detects the connection of the digital camera 200 prior to the expiration of that predetermined amount of time, the procedure moves to S410, where the control unit 109 issues, to the digital camera 200, a request to perform the correction process.

Figure 8:
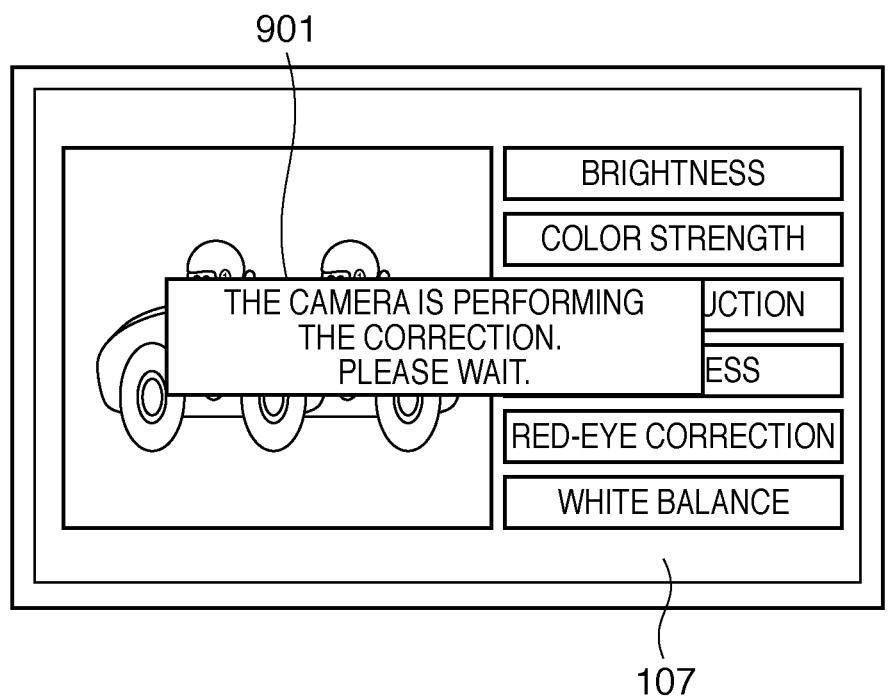
FIG. 8 is a diagram illustrating an example of a message GUI displayed in the display unit 107 of the digital TV 100 while the digital camera 200 is carrying out image processing, according to the first embodiment of the present invention.

The control unit 109 waits for the results of the correction request to be returned from the digital camera 200, and at the same time, uses the GUI generation unit 110 and the image processing unit 104 to display, in the display unit 107, a message GUI 901 notifying the user that the data is being processed (S411). FIG. 8 illustrates an example of message GUI 901 display.

After this, upon acquiring a corrected image file from the digital camera 200, the control unit 109 passes that file to the decoding unit 102, which then carries out a decoding process (S412). The image file acquired from the digital camera 200 is a file in which a correction process was performed by the digital camera 200 based on RAW data, and which was then converted into a JPEG image file. However, in the case where a response indicating that the corresponding RAW data is not present has been received instead of a corrected image file, the control unit 109 advances the procedure to S405, and issues, to the image processing unit 104, a request to perform the correction process. Alternatively, the user may be notified that the RAW data is not present, and a GUI inquiring about subsequent processing may be displayed in the display unit 107.

More specifically, the user can be allowed to select whether to retry the correction process using the digital camera 200, or to perform the correction process using the image processing unit 104.

Figure 9:
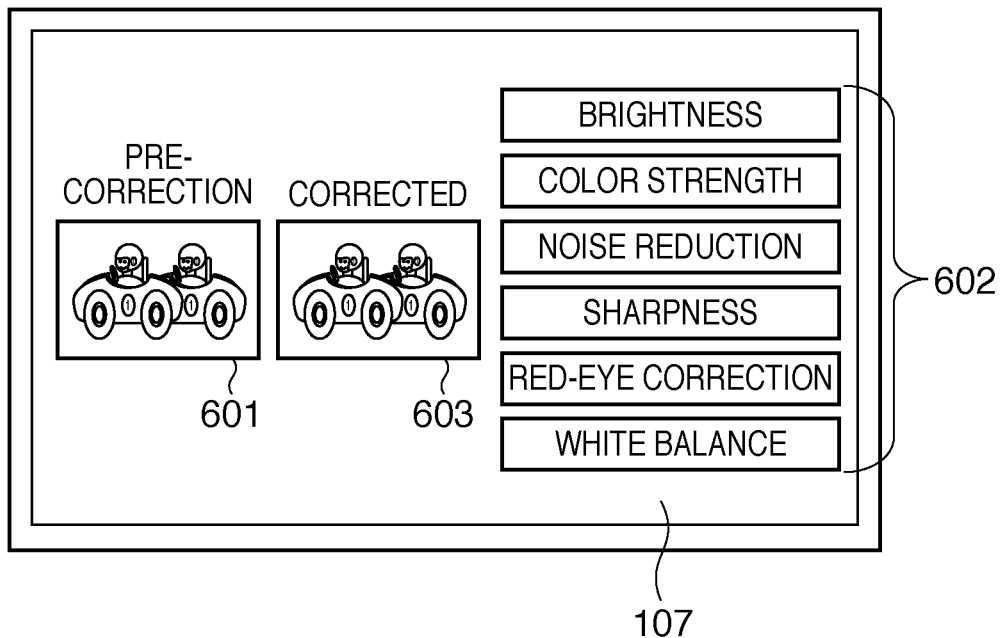
FIG. 9 is a diagram illustrating an example of a display that makes it possible to compare pre- and post-correction image data, according to the first embodiment of the present invention.

The image data obtained by decoding the corrected image file is combined with the image-correction GUI 602 and the pre-correction JPEG image 601 by the image processing unit 104 and displayed in the display unit 107 (S413). FIG. 9 illustrates an example thereof. The example in FIG. 9 shows a case where the pre-correction JPEG image 601 and corrected image data 603 are combined side-by-side.

Note that when requesting the correction process to be performed, the correction parameters may, for example, not be specified, and instead, multiple processing results may be obtained by making multiple specifications.

Figure 10:
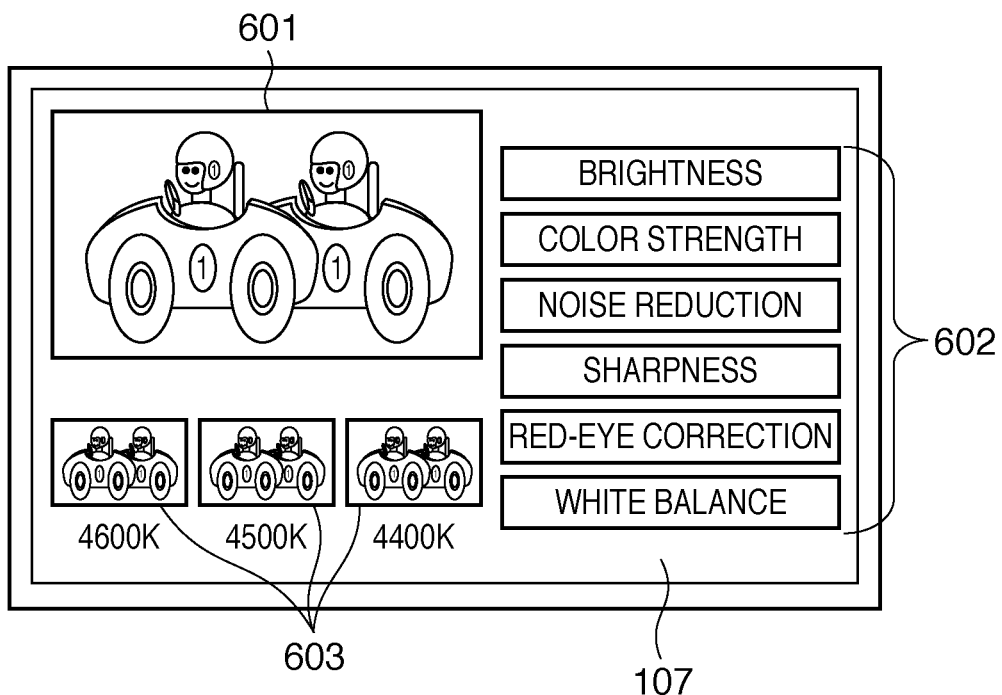
FIG. 10 is a diagram illustrating another example of a display that makes it possible to compare pre- and post-correction image data, according to the first embodiment of the present invention.

FIG. 10 is a diagram illustrating an example of the display in such a case.

This example shows a case where the results of performing white balance processing using three parameters with differing color temperatures on corrected image data 603. In this case, assuming that there are three settable color temperatures, the three color temperatures may be taken as the correction parameters even if the control unit 109 notifies the digital camera 200 of only the correction item (white balance processing) as the specifics of the correction. In addition, even if only a single correction parameter has been specified, the digital camera 200 can also automatically change the value of that parameter and generate correction results.

The control unit 109 then acquires the three different image files from the digital camera 200 in S412.

After this, the control unit 109 determines whether or not to carry out further corrections (that is, whether or not to end the correction processing) (S414). In the case where the control unit 109 has determined to continue the correction processing, the procedure returns to S402. However, in the case where the control unit 109 has determined to end the correction processing, the control unit 109 ends the correction processing, and, for example, switches the display in the display unit 107 to a broadcasted program or the like.

Next, the processing performed by the digital camera 200 shall be described.

First, in response to a request from the digital TV 100, the camera control unit 203 of the digital camera 200 reads out a JPEG image file from the memory card 206 through the card I/F unit 204 and transmits that file to the digital TV 100 via the external I/F unit 205 (S501).

Then, upon receiving a correction request for a specific JPEG image file from the digital TV 100 (S502), the camera control unit 203 confirms whether or not RAW data corresponding to the JPEG image file for which the correction was requested is present within the memory card 206 (S503).

The presence/absence of the RAW data can be confirmed based on whether or not data that has a RAW data extension and has the same name as the specified JPEG image file is present in the memory card 206. In S503, the camera control unit 203 acquires the correction process to be performed on the RAW data and the correction parameters from the digital TV 100.

Here, in the case where no RAW data is present, such as a case where the memory card 206 has been replaced, the camera control unit 203 transmits a notification indicating that the correction process could not be performed to the digital TV 100 (S505).

However, in the case where corresponding RAW data is present, the camera control unit 203 uses the camera image processing unit 202 to execute the correction process based on the correction parameters acquired from the digital TV 100 (S504). The camera image processing unit 202 also converts the results of the correction process into a JPEG image file. The camera control unit 203 then transmits the corrected JPEG image file to the digital TV 100 through the camera external I/F unit 205 in S505.

Note that when implementing a display such as the example shown in FIG. 10, the digital camera 200 generates multiple correction process results in S504, as described above. The method of this generation may be any of the following:

1) If only one correction parameter has been acquired from the digital TV 100, the correction process is performed based on that parameter; in addition to this, a correction process is also executed using a value obtained by increasing/decreasing that parameter value by a predetermined amount.

2) If no correction parameters have been acquired from the digital TV 100, a predetermined number of settable correction parameters are set as appropriate and the correction process is executed based thereupon.

3) If multiple correction parameter have been acquired from the digital TV 100, the correction process is executed based on the individual correction parameters.

Figure 11:
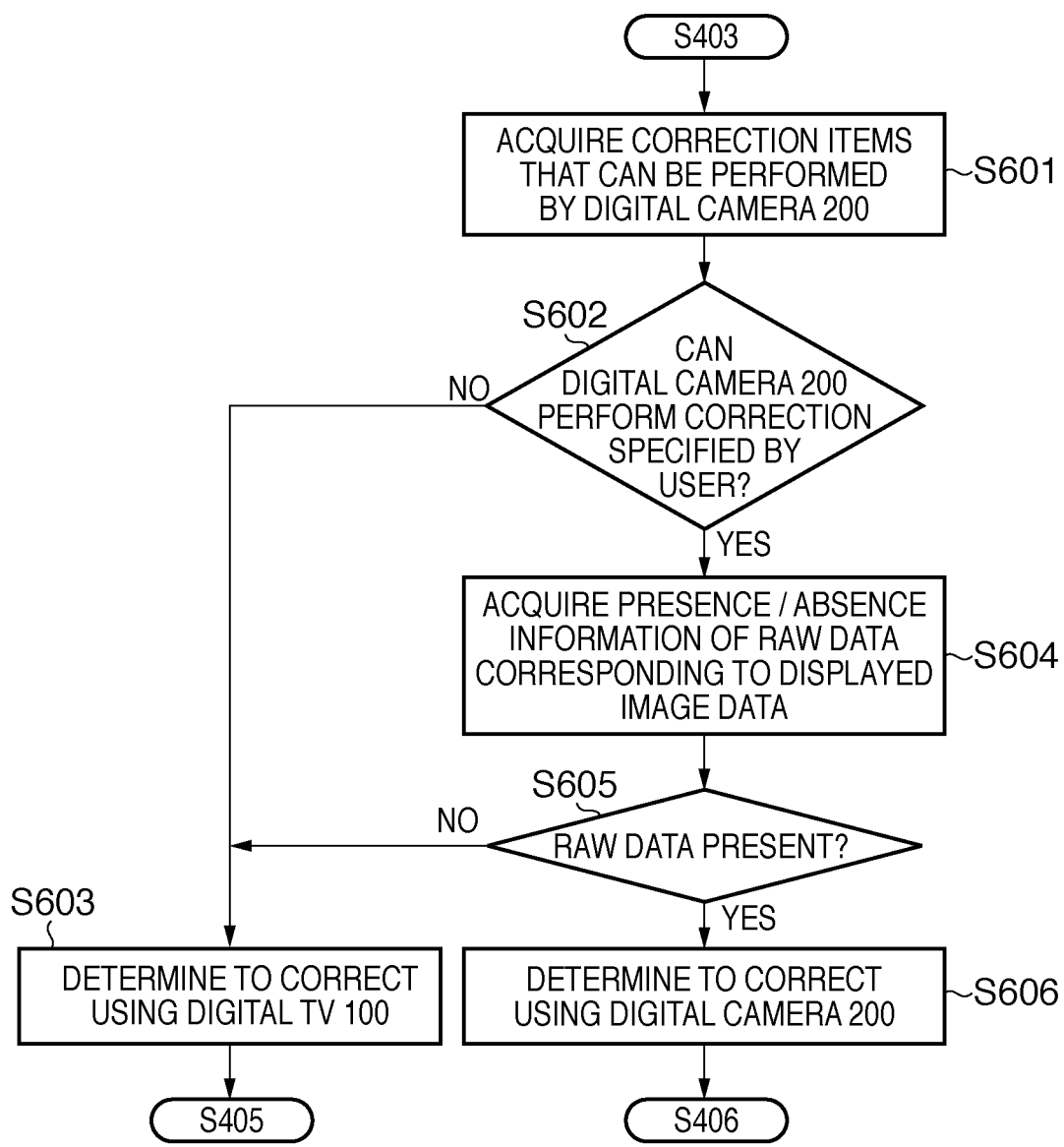
FIG. 11 is a flowchart illustrating details of a determination process executed by an image process determining unit 112 in the digital TV 100, according to the first embodiment of the present invention.

FIG. 11 is a flowchart illustrating details of the determination process executed by the image process determining unit 112 in S404 of FIG. 4.

First, upon being requested by the control unit 109 to perform a determination, the image process determining unit 112 acquires, from the memory unit 105, the correction process items that can be executed by the digital camera 200 (S601). The correction process items are added, as attribute information, to the individual image files held in the memory unit 105. Therefore, by acquiring the attribute information of the image file corresponding to the image data that is being displayed, the image process determining unit 112 can acquire the correction process items that can be executed by the digital camera 200.

Next, the image process determining unit 112 determines whether or not the correction process specified by the user can be executed by the digital camera 200 based on the acquired correction process items (S602).

In the case where the correction process specified by the user cannot be executed by the digital camera 200, the image process determining unit 112 determines that the correction is to be executed by the digital TV 100 (S603). However, in the case where the correction process specified by the user can be executed by the digital camera 200, the image process determining unit 112 once again accesses the memory unit 105 and acquires the presence/absence information regarding the RAW data corresponding to the image data that is currently displayed (S604). The presence/absence information is, as was described above, recorded in the image file as attribute information.

Next, the image process determining unit 112 determines the device that is to perform the correction, based on the acquired presence/absence information (S605). In the case where RAW data corresponding to the image data that is currently displayed is not present in the digital camera 200, the procedure moves to S503, where the image process determining unit 112 determines that the correction process is to be performed by the digital TV 100. However, in the case where the corresponding RAW data is present in the digital camera 200, the image process determining unit 112 determines that the correction process is to be performed by the digital camera 200 (S605).

As described thus far, according to the present embodiment, in an image processing apparatus capable of executing image-correction processing on irreversible-compression encoded image data obtained from the digital camera, it is first confirmed whether or not RAW data corresponding to the image data upon which the image-correction processing is to be executed is present in the digital camera. In the case where the RAW data is present in the digital camera, the image-correction processing is then applied to the RAW data, and the irreversible-compression encoded image data is requested to be sent.

For this reason, it is possible to suppress degradation in the image quality following the image-correction processing more than in the case where the image-correction processing is directly applied using the image processing apparatus and the data is once again subjected to irreversible-compression encoding.

Furthermore, because the data amount (number of bits) per pixel is generally greater in RAW data than in irreversibly-compressed image data, a higher-quality corrected image can be obtained by performing the image-correction processing using RAW data.

Second Embodiment

In the first embodiment, the image process determining unit 112 determines whether the image-correction processing specified by the user can be executed by the digital camera 200, and whether or not RAW data corresponding to the image data currently displayed (the image data to be corrected) is present in the digital camera 200, thereby determining whether the image-correction processing is to be performed by the digital TV 100 or by the digital camera 200.

As opposed to this, a feature of the present embodiment is that the device that is to perform the correction process is determined taking into consideration the compression rate of the image data currently displayed.

In the present embodiment, all but the determination process performed by the image process determining unit 112 is common with the first embodiment, and thus only the determination process according to the present embodiment shall be described hereinafter.

Figure 12:
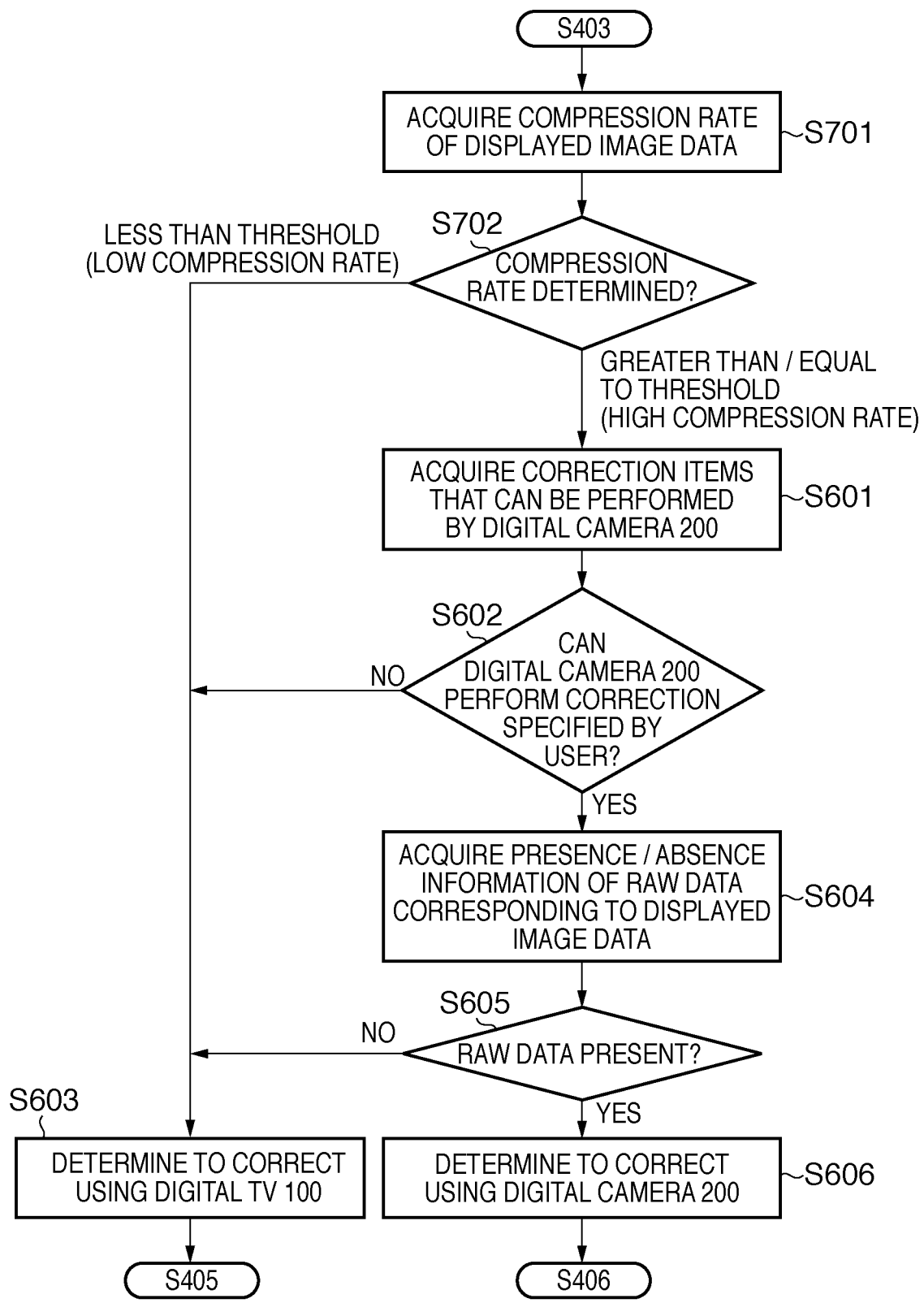
FIG. 12 is a flowchart illustrating details of a determination process executed by the image process determining unit 112 in the digital TV 100, according to a second embodiment of the present invention.

FIG. 12 is a flowchart illustrating details of the determination process executed by the image process determining unit 112 in the digital TV 100, serving as an example of an image processing apparatus according to the second embodiment of the present invention.

In FIG. 12, steps that carry out the same processes as in FIG. 11 are given the same reference numerals, and descriptions thereof shall be omitted. Accordingly, only the processes performed in S701 and S702, which are unique to FIG. 12, shall be described hereinafter.

First, upon being requested by the control unit 109 to perform a determination, the image process determining unit 112 acquires, from the memory unit 105, the compression rate of the image data currently displayed in the display unit 107 (S701).

The compression rate is added, as attribute information, to the individual image files held in the memory unit 105. This addition is performed by the digital camera 200. As with other attribute information, the compression rate is compliant with the Exif format and is denoted in a user area (for example, MakerNote) included in a non-compressed area of each image file.

Next, the image process determining unit 112 determines whether the correction process to be performed on the image file is to be performed using the digital TV 100 or using the digital camera 200, based on the acquired compression rate (S702).

In S702, the image process determining unit 112 determines that the correction process is to be executed by the digital camera 200 in the case where the compression rate of the image file is greater than or equal to a predetermined compression rate, or in other words, when the compression rate of the encoding process is higher than a certain constant; the procedure then moves to S601. However, in the case where the compression rate is lower than a predetermined threshold, or in other words, when the compression rate of the encoding process is low, the image process determining unit 112 determines that the performing the correction using the digital TV 100 will not significantly degrade the image quality, and thus the procedure moves to S603. The steps occurring thereafter are the same as in the first embodiment.

As described thus far, according to the present embodiment, the correction process is performed by the image processing apparatus, whereby the loss of image data during the irreversible-compression encoding is low, in the case where the compression rate of the imaged data that is currently displayed is low. An effect can therefore be achieved whereby the frequency of exchanges of image files and control information with the digital camera can be reduced, in addition to the effects achievable by the first embodiment.

Third Embodiment

In the first embodiment, the image process determining unit 112 determines whether the image-correction processing specified by the user can be executed by the digital camera 200, and whether or not RAW data corresponding to the image data currently displayed (the image data to be corrected) is present in the digital camera 200, thereby determining whether the image-correction processing is to be performed by the digital TV 100 or by the digital camera 200.

As opposed to this, a feature of the present embodiment is that the image process determining unit 112 determines that the correction is to be performed by the digital TV 100 in the case where correction processing items specified by the user have been registered, in advance, as correction processing items to be executed by the digital TV 100 (TV correction items).

In the present embodiment, all but the determination processing performed by the image process determining unit 112 is common with the first embodiment, and thus only the determination processing according to the present embodiment shall be described hereinafter.

Figure 13:
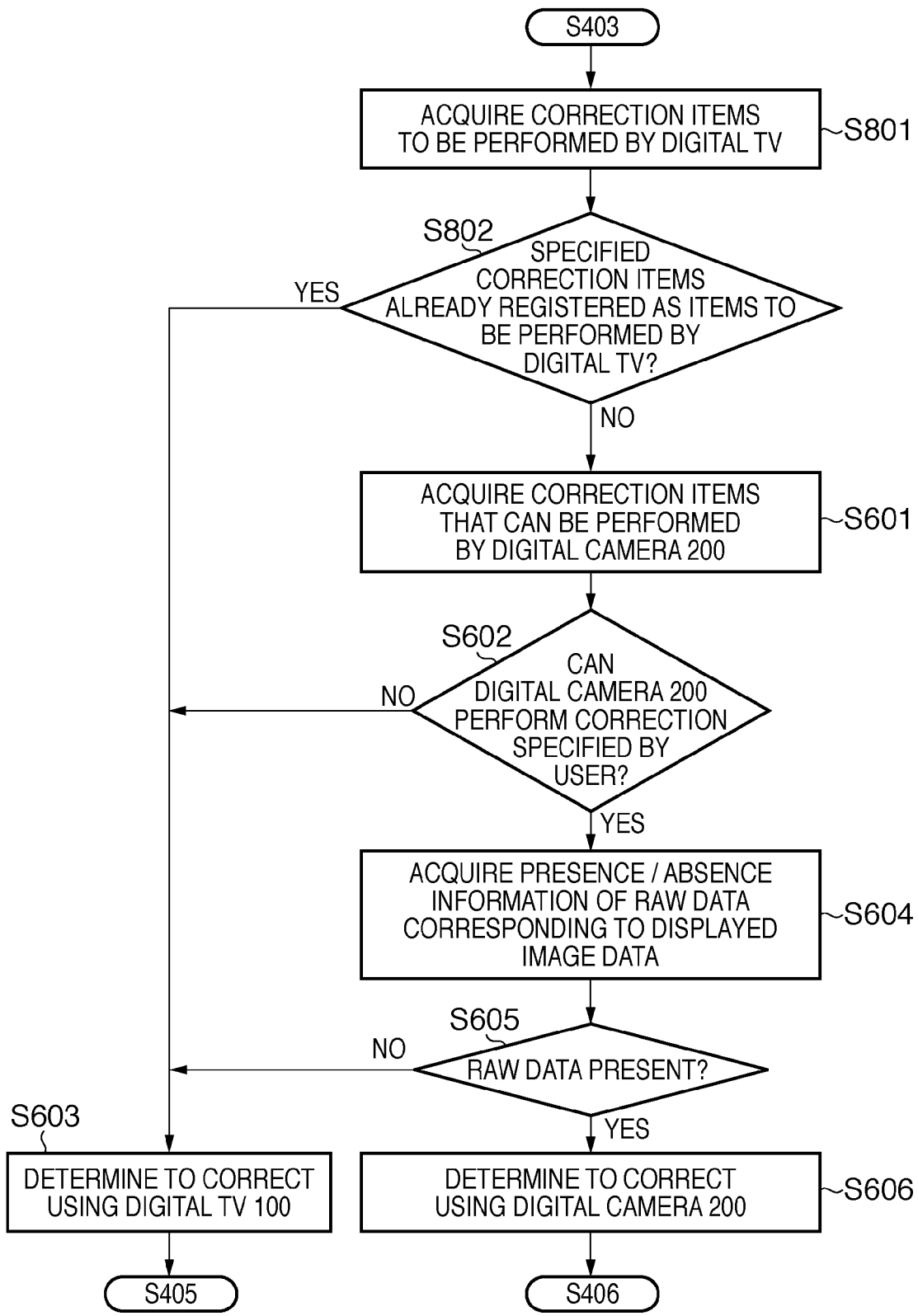
FIG. 13 is a flowchart illustrating details of a determination process executed by the image process determining unit 112 in the digital TV 100, according to a third embodiment of the present invention.

FIG. 13 is a flowchart illustrating details of the determination process executed by the image process determining unit 112 in the digital TV 100, serving as an example of an image processing apparatus according to the third embodiment.

In FIG. 13, steps that carry out the same processes as in FIG. 11 are given the same reference numerals, and descriptions thereof shall be omitted. Accordingly, only the processes performed in S801 and S802, which are unique to FIG. 13, shall be described hereinafter.

First, upon being requested by the control unit 109 to perform a determination, the image process determining unit 112 acquires, from the memory unit 105, the correction processing items to be performed by the digital TV 100 (the TV correction items) (S801). The TV correction items are registered in advance in the memory unit 105 in, for example, list format. The TV correction items may alternatively be set in advance by the user. Correction processing that reduces the data in the original image, such as grayscale processing, binarization processing, and so on, can be given as examples of typical correction processing items registered in the list. This is because it can be thought that there is actually little need to use RAW data when performing such kinds of correction processes.

The image process determining unit 112 then determines whether or not an image correction item specified by the user through the image-correction GUI 602 is registered as a TV correction item (S802).

In the case where it has been determined that the specified image correction item is included in the TV correction items, the image process determining unit 112 moves the procedure to S603, and determines that the correction process is to be performed by the digital TV 100. However, in the case where it has been determined that the specified image correction item is not included in the TV correction items, the procedure moves to S601, where the same determination process as in the first embodiment is performed.

As described thus far, according to the present embodiment, image-correction processing registered in advance as a correction processing item performed by the image processing apparatus is carried out by the image processing apparatus. An effect can therefore be achieved whereby the frequency of exchanges of image files and control information with the digital camera can be reduced, in addition to the effects achievable by the first embodiment.

Fourth Embodiment

Next, an image processing apparatus according to a fourth embodiment of the present invention shall be described. The image processing apparatus of the present embodiment stores a correction history, and thus even if the user has made multiple corrections to a single image, it is possible to obtain correction results that reflect all of the corrections that have been made.

The image processing apparatus according to the present embodiment may have the same functional configuration as the digital TV 100 of the first embodiment, and thus descriptions of the configuration shall be omitted. Note that the correction history is assumed to be stored in the memory unit 105. In other words, the memory unit 105 functions as a history information storage unit.

Figure 14:
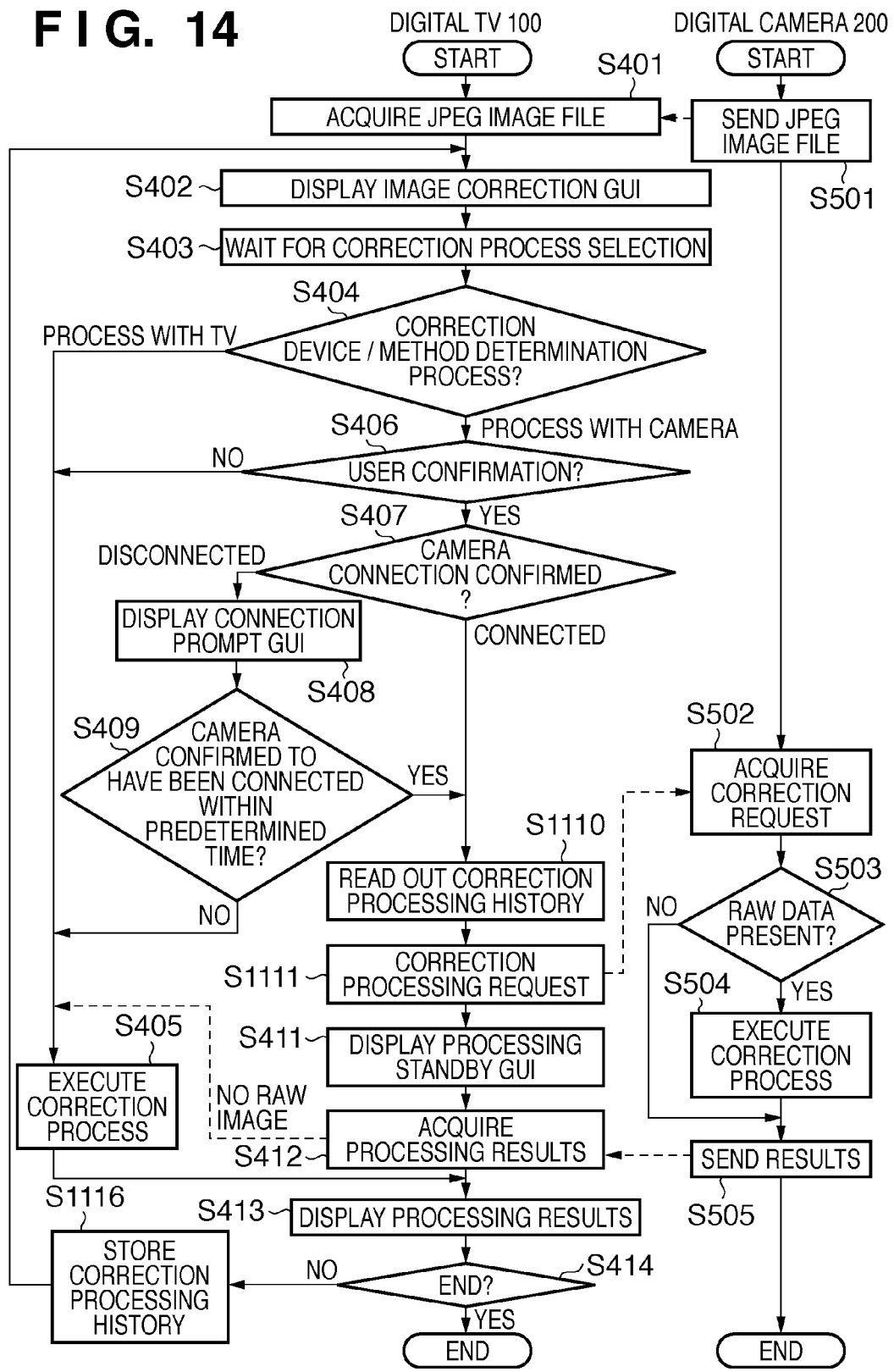
FIG. 14 is a flowchart illustrating an outline of image-correction processing performed by an image processing system according to a fourth embodiment of the present invention.

FIG. 14 is a flowchart illustrating image-correction processing performed by the digital TV 100 according to the fourth embodiment; the same reference numerals are given to processing steps identical to those in FIG. 4, and redundant descriptions thereof shall be omitted.

Accordingly, the following descriptions shall focus mainly on S1110, S1111, and S1116, which are unique to FIG. 14. It is assumed here that in S401 to S404, the correction process has been determined to be carried out by the digital camera 200, and in S406, the user's confirmation has been received.

Upon the connection between the digital camera 200 and the digital TV 100 being confirmed in S407 or S409, the control unit 109 reads out, from the memory unit 105, a history of the correction processes that have been performed on the currently-displayed image data in the past (S1110). The "history" referred to here is a processing history starting with the current display of the image data in the digital TV 100; if other image data is displayed and the original image data is then displayed once again, this processing history does not exist.

Next, in S1111, the control unit 109 requests the digital camera 200 to execute the correction processes applied thus far in addition to the correction processing currently specified. Here, the control unit 109 also specifies the processing order for the correction. The processing order starts from the oldest process in the history.

Meanwhile, when the series of image-correction processing has ended and the correction processing is to be continued (S414, NO), the control unit 109 updates the correction history in the memory unit 105 (S1116). Specifically, the control unit 109 adds the specifics of the correction process that was added in this instance to the history that is already stored. Updating the history in such a manner makes it possible to consistently obtain correction results that reflect the results starting with the first image-correction processing, even if new correction processes have been added along the way.

As described thus far, according to the present embodiment, a history of the correction processes that have been applied to a piece of image data is held, and when a new correction process is performed, the digital camera 200 is requested to perform the new correction process after performing the correction processes that have been applied in the past. Accordingly, correction results that reflect the correction results of the past can be obtained at the same high image quality, even if various correction processes have been made on the currently-displayed image data.

Note that the user may be requested to confirm each history update. Furthermore, a GUI by which the user can edit the history may be provided by the GUI generation unit 110.

Finally, the present embodiment can be carried out in combination with any of the above first through third embodiments.

Other Embodiments

The above embodiments may be implemented through software by a computer (or CPU, MPU, or the like) of a system or apparatus.

Therefore, the present invention is realized by a computer program supplied to a computer in order to implement the above embodiments using that computer. In other words, the computer program itself, for realizing the functionality of the above embodiments, is also included within the scope of the present invention.

Note that the computer program for realizing the above embodiments may be in any form as long as the program can be read by a computer. For example, the program can be configured using object code, a program executed by an interpreter, configured using script data and the like supplied to an OS, and so on, but is not intended to be limited thereto.

The computer program for implementing the above embodiments is supplied to a computer via a storage medium or hard-wired/wireless communication. A flexible disk, a hard disk, a magnetic storage medium such as magnetic tape, an optical/magneto-optical storage medium such as an MO, CD, and a DVD, a non-volatile semiconductor memory, and the like are examples of storage media that can be used to supply the program.

A method that utilizes a server on a computer network can be given as an example of a method for supplying the computer program using hard-wired/wireless communication. In this case, a data file (program file) that embodies the computer program that realizes the present invention is stored in the server. The program file may be an executable file, or may be source code.

The program can be supplied to a client computer that accesses the server by downloading the program file from the server. In this case, the program file can be divided into a plurality of segment files, and the segment files may be distributed among different servers.

In other words, a server device that supplies the program file for realizing the above embodiments to a client computer also falls within the scope of the present invention.

Furthermore, the computer program for realizing the above embodiments may be encrypted and stored in a storage medium, which is then distributed; key information for decrypting the file may be supplied to users who satisfy a predetermined condition, thereby allowing those users to install the program in their computers. The key information can be supplied by, for example, allowing the key information to be downloaded from a homepage via the Internet.

Furthermore, the computer program for realizing the above embodiments may make use of the functions of an OS already running on the computer.

Further still, the computer program for realizing the above embodiments may be partially configured of firmware for an expansion board or the like attached to the computer or may be executed by a CPU provided in that expansion board or the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-302079, filed on Nov. 21, 2007, which is hereby incorporated by reference herein its entirety.

What is claimed is:

1. An image processing apparatus, comprising:
an interface that communicates with a camera;
an acquisition unit that acquires compressed image data which is obtained by compressing image data photographed by the camera from the camera via the interface;
a decompressing unit that decompresses the compressed image data acquired by the acquisition unit;
an image correction unit for performing image-correction processing according to a parameter set by a user, on the image data decompressed by the decompressing unit; and
a control unit that controls the acquisition unit and the image correction unit in accordance with a compression rate of the compressed image data acquired by the acquisition unit,
wherein the control unit controls the acquisition unit to further acquire compressed corrected image data on which the image-correction processing has been performed by the camera from the camera in the case where:
(a) the compression rate of the compressed image data acquired by the acquisition unit is larger than a threshold value and
(b) corresponding image data, which is not compressed and corresponds to the compressed image data of which the compression rate is larger than the threshold value, exists in the camera, and
wherein the control unit further controls the image correction unit to perform the image-correction processing on the decompressed image data decompressed by the decompressing unit in the case where the compression rate of the compressed image data acquired by the acquisition unit is smaller than the threshold value.

2. The image processing apparatus according to claim 1, wherein the acquisition unit further acquires attribute information of the compressed image data; and
the control unit detects the compression rate of the compressed image data based on the attribute information.

3. A control method for an image processing apparatus provided with an image correction unit for performing image-correction processing according to a parameter set by a user on decompressed image data and an interface for communicating with a camera, comprising the steps of:
acquiring compressed image data which is obtained by compressing image data photographed by the camera from the camera via the interface;
decompressing the compressed image data acquired in the acquiring step; and
further acquiring compressed corrected image data on which the image-correction processing has been performed by the camera from the camera, in the case where:
(a) the compression rate of the compressed image data acquired in the acquisition step is larger than a threshold value, and
(b) corresponding image data, which is not compressed and corresponds to the compressed image data of which the compression rate is larger than the threshold value, exists in the camera; and
controlling the image correction unit to perform the image-correction processing on the decompressed image data decompressed in the decompressing step in the case where the compression rate of the compressed image data acquired by the acquisition unit is smaller than the threshold value.

4. An image processing apparatus comprising:
an acquisition unit that acquires compressed image data obtained by compressing first image data;
a decompressing unit that decompresses the compressed image data acquired by the acquisition unit;
an image processing unit for performing image processing on the image data decompressed by the decompressing unit according to a set parameter; and
a control unit that executes control in accordance with a compression rate of the compressed image data acquired by the acquisition unit,
wherein if the compression rate of the compressed image data acquired by the acquisition unit is larger than a threshold value, the control unit controls the acquisition unit to acquire, from an external apparatus, compressed processed image data obtained by the external apparatus by performing the image processing on the first image data according to the set parameter.

5. The image processing apparatus according to claim 4, further comprising:
a communication unit that communicates with the external apparatus,
wherein if the compression rate of the compressed image data acquired by the acquisition unit is larger than a threshold value, the control unit controls the communication unit to request the external apparatus for a transmission of the image data obtained by the external apparatus by performing the image processing on the first image data according to the set parameter.

6. The image processing apparatus according to claim 5, wherein the control unit controls the communication unit to transmit to the external apparatus a command requesting the image processing according to the set parameter.

7. The image processing apparatus according to claim 6, wherein the acquisition unit acquires compressed image data obtained by the external apparatus by performing the image processing according to the set parameter on the first image data responsive to the command and then compressing the first image data on which the image processing has been performed.

8. The image processing apparatus according to claim 4, further comprising:
a display control unit that outputs at least one of the image data output from the image processing unit and the image data, which is acquired from the external apparatus and on which the image processing according to the set parameter has been performed by the external apparatus.

9. The image processing apparatus according to claim 4, wherein if the compression rate of the compressed image data acquired by the acquisition unit is smaller than the threshold value, the control unit controls the acquisition unit not to acquire the image data on which the image processing according to the set parameter has been performed from the external apparatus and controls the image processing unit to perform the image processing on the image data decompressed by the decompressing unit according to the set parameter.

10. An image processing apparatus comprising:
an acquisition unit that acquires compressed image data obtained by compressing first image data;
a decompressing unit that decompresses the compressed image data acquired by the acquisition unit;
an image processing unit for performing image processing on the image data decompressed by the decompressing unit according to the a set parameter;
a control unit; and
a mode setting unit that sets one of a plurality of modes according to a compression rate of the compressed image data acquired by the acquisition unit,
wherein the plurality of modes includes:
(a) a first mode that is set when the compression rate of the compressed image data acquired by the acquisition unit is larger than a threshold value, and in which the control unit controls the acquisition unit to acquire, from an external apparatus, compressed processed image data obtained by the external apparatus by performing the image processing on the first image data according to the set parameter, and
(b) a second mode that is set when the compression rate of the compressed image data acquired by the acquisition unit is smaller than the threshold value and in which the control unit controls the image processing unit to perform the image processing on the decompressed image data, decompressed by the decompressing unit, according to the set parameter.

11. A control method for an image processing apparatus provided with an image processing unit for performing image processing on the image data decompressed according to a set parameter comprising the steps of:
acquiring compressed image data obtained by compressing first image data;
decompressing the compressed image data acquired in the acquisition step; and
in a case where the compression rate of the compressed image data acquired in the acquiring step is larger than a threshold value, acquiring, from an external apparatus, compressed processed image data obtained by the external apparatus by performing the image processing on the first image data according to the set parameter.

12. The control method according to claim 11, further comprising the steps of:
communicating with the external apparatus, and
in the case where the compression rate of the compressed image data acquired in the acquiring step is larger than a threshold value, the communicating step requests the external apparatus for a transmission of the image data obtained by the external apparatus by performing the image processing on the first image data according to the set parameter.

13. The control method according to claim 12, wherein the communicating step transmits to the external apparatus a command requesting the image processing according to the set parameter.

14. The control method according to claim 13, wherein the acquiring step acquires the compressed image data obtained by the external apparatus by performing the image processing according to the set parameter on the first image data responsive to the command and then compressing the first image data on which the image processing has been performed.

15. The control method according to claim 11, further comprising:
a display step of outputting at least one of the image data output from the image processing unit and the image data which is acquired from the external apparatus and on which the image processing according to the set parameter has been performed by the external apparatus.

16. The control method according to claim 11, wherein in the case where the compression rate of the compressed image data acquired in the acquiring step is smaller than the threshold value, the acquiring step does not acquire the image data on which the image processing according to the set parameter has been performed from the external apparatus and performing with the image processing unit the image processing on the image data decompressed by the decompressing unit according to the set parameter.

17. A control method for an image processing apparatus provided with an image processing unit for performing image processing on the image data decompressed according to a set parameter comprising the steps of:

acquiring compressed image data obtained by compressing first image data;

decompressing the compressed image data acquired in the acquiring step; and mode setting that sets one of a plurality of modes according to a compression rate of the compressed image data acquired in the acquiring step, wherein the plurality of modes includes:

(a) a first mode that is set when the compression rate of the compressed image data acquired in the acquiring step is larger than a threshold value and in which case the acquiring step acquires, from an external apparatus, compressed processed image data obtained by the external apparatus by performing the image processing on the first image data according to the set parameter, and (b) a second mode that is set when the compression rate of the compressed image data acquired in the acquiring step unit is smaller than the threshold value and in which the image processing unit performs the image processing on the image data decompressed in the decompressing step according to the set parameter.

* * * * *